United States Patent [19]

Kuno

[11] Patent Number: 4,830,162
[45] Date of Patent: May 16, 1989

[54] CLUTCH COVER AND RELEASE BEARING ASSEMBLY FOR CLUTCH

[75] Inventor: Shozo Kuno, Toyota, Japan

[73] Assignee: Aisin Seiki Kabushiki Kaisha, Kariya, Japan

[21] Appl. No.: 32,387

[22] Filed: Mar. 31, 1987

[30] Foreign Application Priority Data

Mar. 31, 1986 [JP] Japan .................................. 61-73433
Mar. 31, 1986 [JP] Japan .................................. 61-73434

[51] Int. Cl.⁴ .............................................. F16D 23/14
[52] U.S. Cl. ........................ 192/98; 192/89 B; 192/110 B; 403/329
[58] Field of Search ................. 192/70.13, 89 B, 98, 192/110 B, DIG. 1; 403/289, 309, 313, 319, 326, 329

[56] References Cited

U.S. PATENT DOCUMENTS

| | | | |
|---|---|---|---|
| 1,859,425 | 5/1932 | Bell .................................. | 403/329 |
| 2,501,940 | 3/1950 | Hibbard ........................... | 403/329 X |
| 3,177,024 | 4/1965 | Krook et al. ..................... | 403/329 X |
| 4,405,041 | 9/1983 | Broadbent ........................ | 192/98 |
| 4,443,007 | 4/1984 | Adamoski et al. ............... | 403/329 X |
| 4,560,053 | 12/1985 | Lassiaz ............................. | 192/98 |
| 4,613,027 | 9/1986 | Lassiaz et al. ................... | 192/98 X |
| 4,632,237 | 12/1986 | Maycock et al. ................ | 192/98 |
| 4,648,499 | 3/1987 | Despres et al. .................. | 192/98 |
| 4,667,797 | 5/1987 | Ball .................................. | 192/98 |

Primary Examiner—Rodney H. Bonck
Assistant Examiner—Richard M. Lorence
Attorney, Agent, or Firm—Burns, Doane, Swecker & Mathis

[57] ABSTRACT

A clutch cover assembly has a clutch cover adapted to be coupled to a flywheel of an engine, a pressure plate disposed inwardly of the clutch cover, a diaphragm spring having an outer edge engaged by the clutch cover for resiliently pressing the pressure plate, a bearing fixed to an inner edge of the diaphragm spring and having rotatable elements and an inner race supporting the rotatable elements, a bearing hub axially movably disposed in the bearing for being axially movably disposed on an input shaft of a transmission, a locking member disposed between the inner race and the bearing hub for locking the bearing hub against movement with respect to the bearing away from the engine, and a release fork engageable with the bearing hub for axially moving the bearing hub and the bearing away from the engine to release the pressure plate from the diaphragm spring. For dismounting the transmission from the engine, the bearing hub is moved with respect to the bearing toward the engine to allow easy detachment of the input shaft of the transmission. Alternatively, the locking member may disengage from the bearing to permit removal of the bearing hub from the bearing for easy detachment of the transmission input shaft.

6 Claims, 12 Drawing Sheets

CLUTCH COVER AND RELEASE BEARING ASSEMBLY FOR CLUTCH

BACKGROUND OF THE INVENTION

1. Field of the invention:

The present invention relates to a clutch cover assembly of the pull type.

2. Description of the Prior Art:

As shown in FIG. 13 of the accompanying drawings, one conventional clutch cover assembly coupled to an engine comprises a clutch cover 110, a pressure plate 120 disposed inwardly of the clutch cover 110, a diaphragm spring 130 having an outer edge engaged by the clutch cover 110 for pressing the pressure plate 120, a bearing 140 secured to an inner edge of the diaphragm spring 130 and holding rotatable elements 145, a bearing hub 160 integral with the inner race 143 of the bearing 140, and a release fork (not shown) for axially moving the bearing hub 160 away from the pressure plate 120 to release the pressure plate 120 from the pressure of the diaphragm spring 130.

The bearing hub 160 and the bearing 140 are of a unitary structure, and the bearing hub 160 projects from the bearing hub 160 toward a transmission (not shown).

When disassembling the transmission from the engine, the tip end of the input shaft of the transmission is slid up to the end face of the bearing hub 160 so that the input shaft can be removed clear of the bearing hub 160. Therefore, it is necessary for the clutch cover assembly to have a large space to allow the input shaft of the transmission to slide therein for detachment.

SUMMARY OF THE PRESENT INVENTION

In view of the aforesaid drawback of the conventional clutch cover assembly, it is an object of the present invention to provide a clutch cover assembly which does not require a large space to allow a transmission to slide therein when the transmission is to be dismounted from an associated engine.

Another object of the present invention is to provide a clutch cover assembly capable of allowing easy detachment of a transmission from an associated engine.

According to the present invention, there is provided a clutch cover assembly including a clutch cover adapted to be coupled to a flywheel of an engine, a pressure plate disposed inwardly of the clutch cover, a diaphragm spring having an outer edge engaged by the clutch cover for resiliently pressing the pressure plate, a bearing fixed to an inner edge of the diaphragm spring and having rotatable elements and an inner race supporting the rotatable elements. A bearing hub is axially movably disposed in the bearing for being axially movably disposed on an input shaft of a transmission and a locking member is disposed between the inner race and the bearing hub for locking the bearing hub against movement with respect to the bearing away from the engine. A release fork is engageable with the bearing hub for axially moving the bearing hub and the bearing away from the engine to release the pressure plate from the diaphragm spring.

According to a first embodiment of the present invention, the locking member comprises at least one key disposed between the bearing hub and the inner race and a pair of snap rings at opposite ends of the key. One of the snap rings is retained on the bearing hub and the other snap ring is retained on the bearing, whereby the bearing hub is axially movable with respect to the bearing toward the engine.

According to another embodiment of the present invention, the inner race has a groove defined in an inner periphery thereof. The locking member comprises at least one lock spring having one end fixed to the bearing hub and an opposite end normally engaging in the groove of the inner race, whereby the bearing hub is axially movable away from the engine when the opposite end of the locking spring is displaced out of the groove. The lock spring has a central raised portion, the opposite end thereof having a hook portion integral with or fixed to the central raised portion and normally engaging in the groove. The hook portion is displaceable out of the groove by pushing the central raised portion toward the bearing hub.

In one preferred embodiment, the locking member is disengageable from the bearing to allow the bearing hub to disengage from the bearing. In a preferred embodiment, the clutch cover assembly includes a locking device mounted on the release fork for locking the bearing hub with respect to the bearing, and a ring member disposed around the bearing hub and movable by the release fork, the locking device being unlockable to allow the release fork to move the ring member toward the engine for disengaging the locking member from the bearing.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

Preferred embodiments of the present invention will be described with reference to the accompanying drawings wherein, like or corresponding parts are denoted by like or corresponding reference numerals throughout the several drawing figures, and wherein.

DESCRIPTION OF THE PREFERRED EMBODIMENTS

Figure 1:
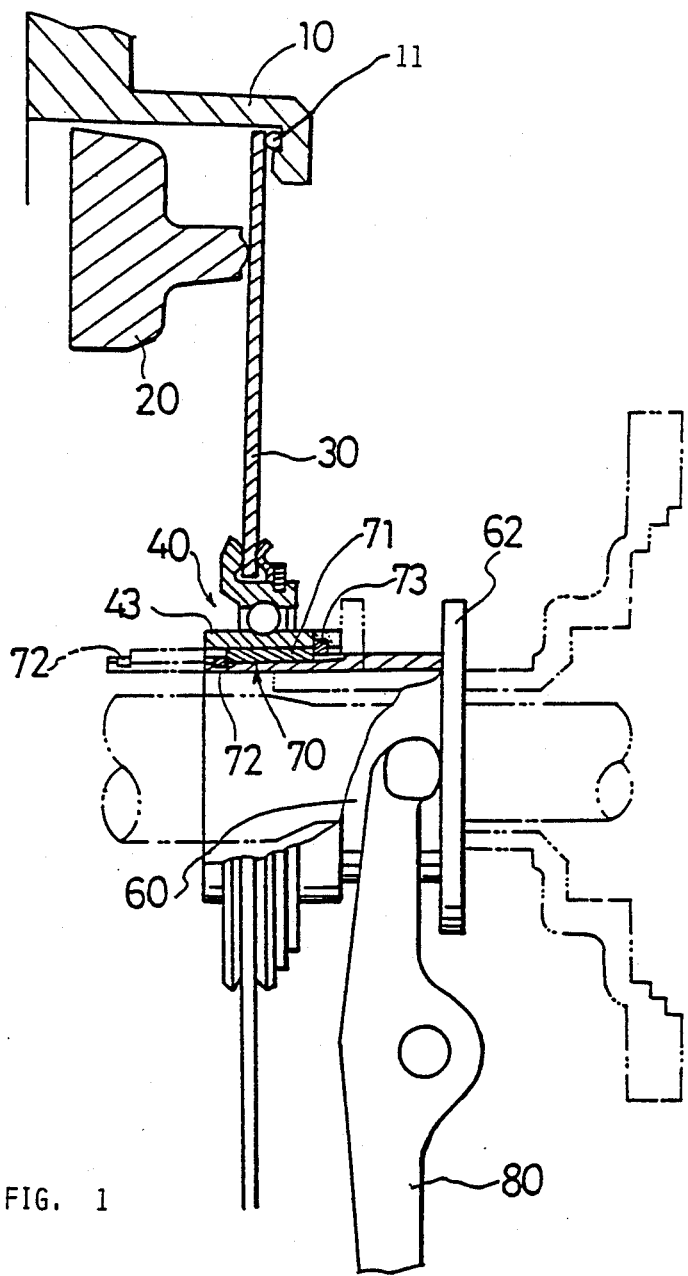
FIG. 1 is a fragmentary, vertical cross-sectional view of a clutch cover assembly according to a first embodiment of the present invention.
Figure 2:
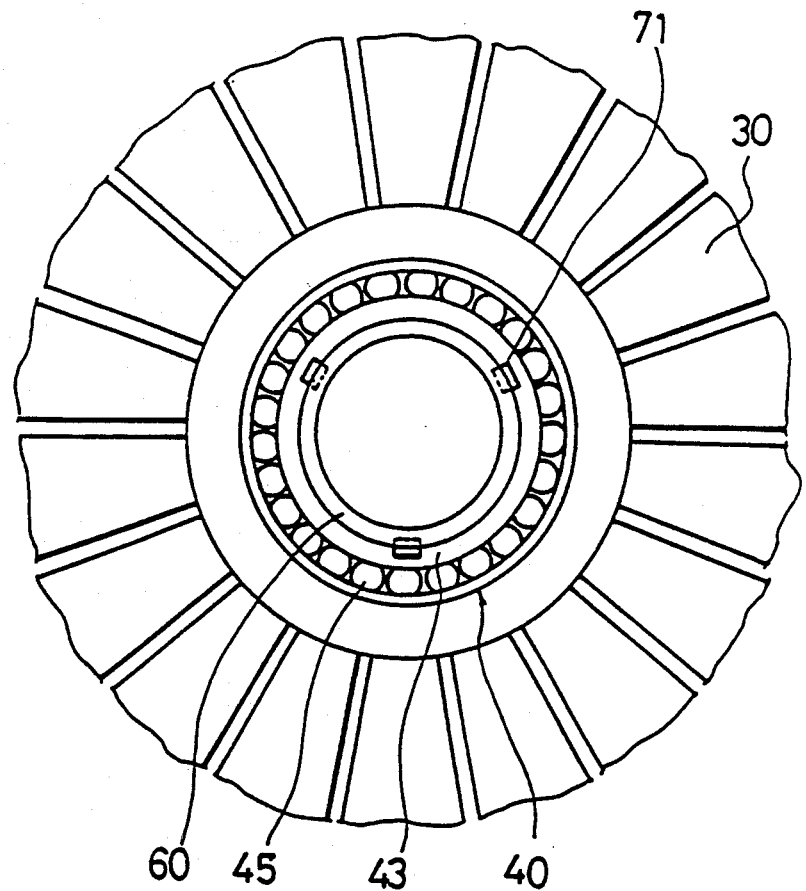
FIG. 2 is a fragmentary, front elevational view of the clutch cover assembly as viewed from an engine.

1st Embodiment:

With reference to FIGS. 1 and 2, a clutch cover assembly according to a first embodiment includes a clutch cover 10, a pressure plate 20, a diaphragm spring 30, a bearing 40, a bearing hub 60, a locking member 70, and a release fork 80. The locking member 70 includes keys 71 and snap rings 72, 73.

The clutch cover assembly is disposed between an engine (not shown) and a transmission (not shown). The clutch cover 10 has an axial side opposite to the engine that is fastened to a flywheel (not shown) by bolts. The pressure plate 20 is disposed within the clutch cover 10 for pressing the friction surface of a clutch disc (not shown). The clutch cover 10 has an end opposite to the transmission and coupled by a wire ring 11 to the outer edge of the diaphragm spring 30. The diaphragm spring 30 has an inner edge fixed to the outer race of the bearing 40. The diaphragm spring 30 in its intermediate position resiliently presses the pressure plate 20 toward the engine, the pressure plate 20 being positioned more closely than the diaphragm spring 30 to the engine. The bearing 40 serves to take up relative rotation of the pressure plate 20 rotating with the flywheel and the bearing hub 60. The bearing hub 60 is axially movably inserted in the bearing 40. The bearing hub 60 has a flange 62 on its end closer to the transmission, the flange 62 being engaged by upper free ends of the release fork 80 at an end surface facing the engine.

The bearing hub 60 is joined to the inner race 43 of the bearing 40 by means of the locking member 70, i.e., three keys 71 (see FIG. 2) and two snap rings 72, 73. The keys 71 are fitted respectively in three angularly spaced key slots defined axially on the outer peripheral surface of the bearing hub 60 at its axial end portion closer to the engine. The snap rings 72, 73 are disposed around the bearing hub 60 against the axially opposite ends of the keys 71 inserted in the key slots. The snap ring 72, closer to the engine, is disposed in an annular groove defined in the bearing hub 60 substantially up to a half of the thickness of the snap ring 72. The other snap ring 73, closer to the transmission, is disposed in an annular groove defined in the inner race 43 substantially up to a half of the thickness of the snap ring 72. With this arrangement, the keys 71 are prevented by the snap ring 73 from moving beyond the inner race 43 toward the transmission, but are allowed to move toward the engine.

When the release fork 80 is turned clockwise (FIG. 1), the clutch is disengaged. More specifically, when the bearing hub 60 is moved toward the transmission, the bearing 40 is also moved toward the transmission since the bearing hub 60 and the bearing 40 are fastened together by the keys 71 and the snap rings 72, 73. Therefore, the diaphragm spring 30 which has been pressed against the pressure plate 20 is released from pressing engagement with the pressure plate 20.

For dismounting the transmission from the engine, the release fork 80 is removed away from the flange 62 of the bearing hub 60. The bearing hub 60 can now be slid toward the engine since the keys 71 are disengaged from the snap ring 73. With the bearing hub 60 thus displaced toward the engine for a predetermined distance as indicated by the broken line in FIG. 1, the distance, an input shaft of the transmission must be pulled away from the engine to remove the shaft is reduced by the same predetermined distance. Accordingly, the clutch cover assembly requires no wide space in which to slide the input shaft of the transmission for detachment. When the transmission is to be mounted on the engine, the input shaft thereof can be pushed toward the engine with the bearing hub 60 slid toward the engine. Thus, the transmission can easily be positioned in place.

Figure 3:
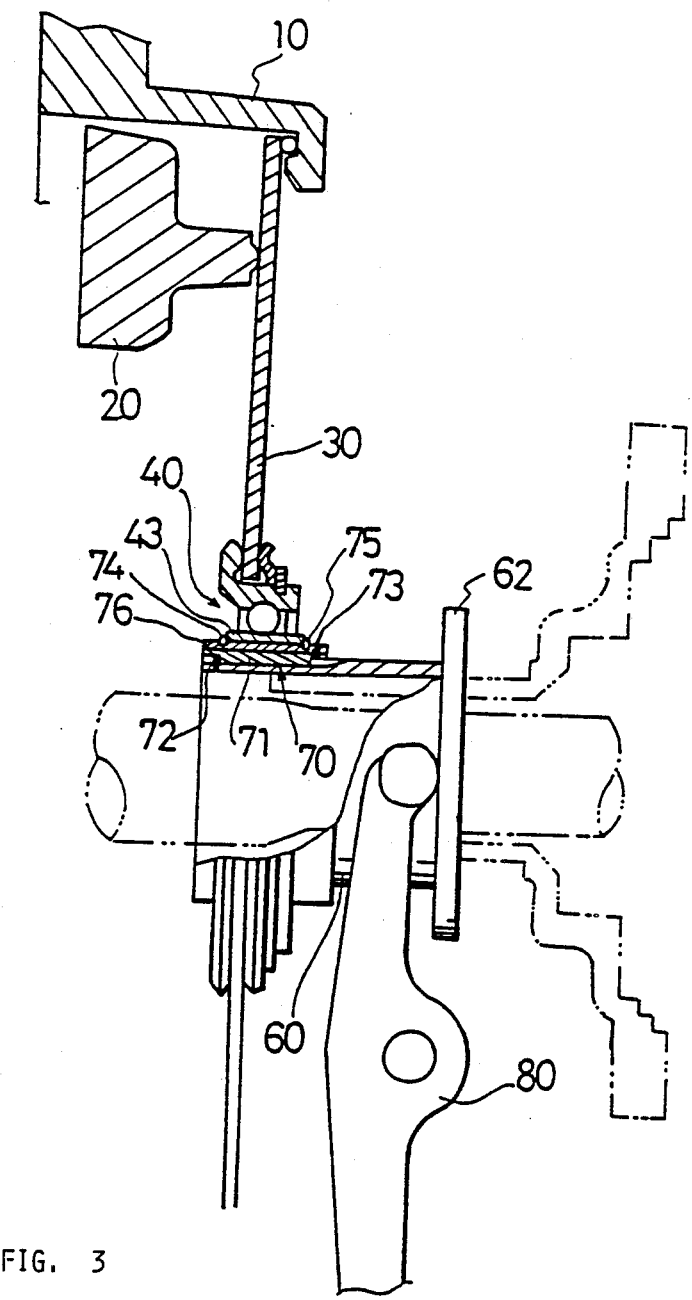
FIG. 3 is a fragmentary, vertical cross-sectional view of a clutch cover assembly according to a modification of the first embodiment.

With reference to FIG. 3, a modification of the firs embodiment includes a sleeve 76 is interposed between the inner race 43 of the bearing 40 and the bearing hub 60. The sleeve 76 is fixed to the inner race 43 by snap rings 74, 75 held against axially opposite ends of the sleeve 76. The snap ring 73 is disposed in an annular groove defined in the sleeve 76. The arrangement of FIG. 3 is advantageous in that the bearing 40 may be of a commercially available standard design inasmuch as its inner race 43 is not required to have an annular groove for receiving the snap ring 73 and can simply be attached to the sleeve 76 by the snap rings 74, 75.

Figure 4:
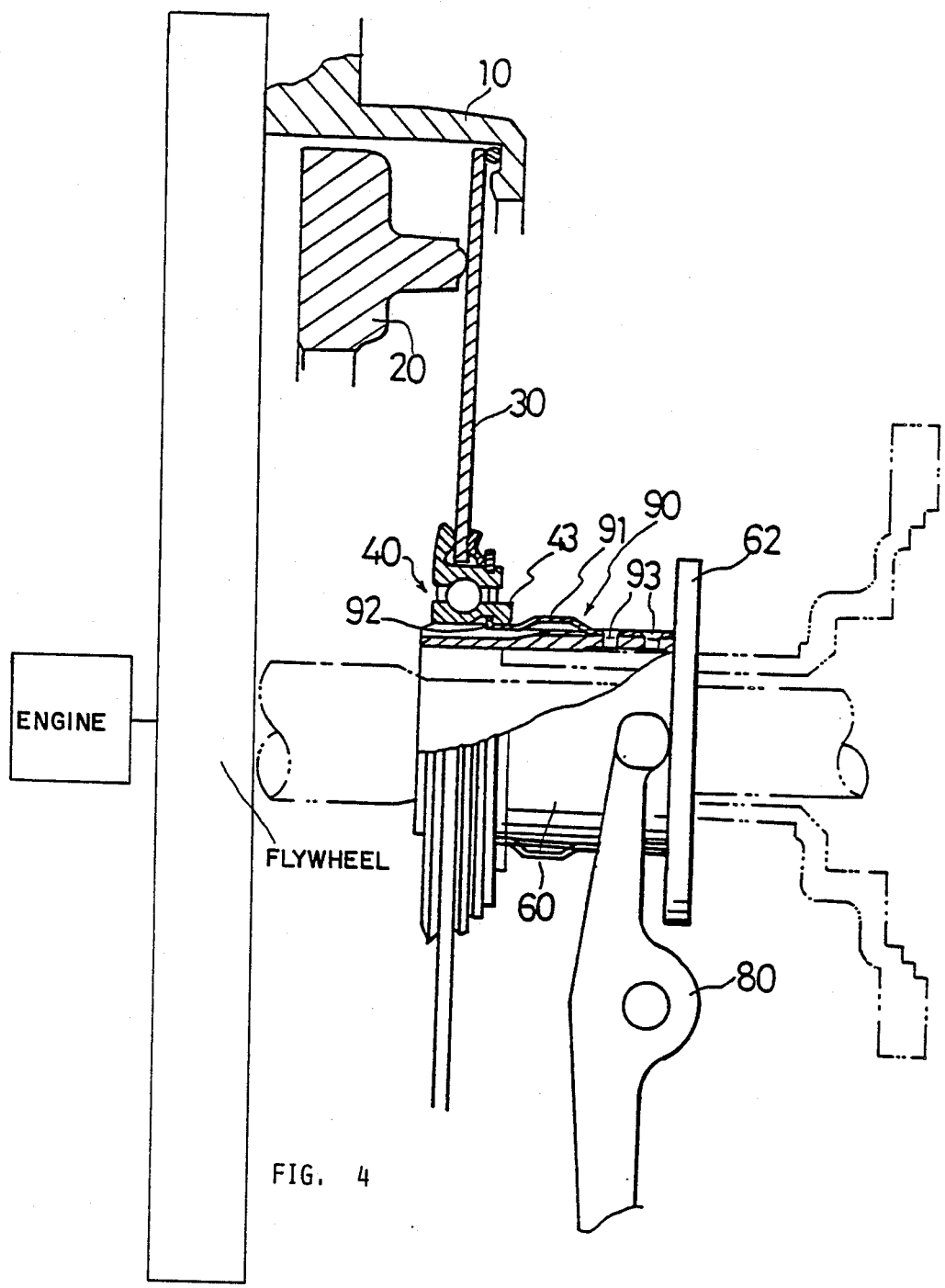
FIG. 4 is a fragmentary, vertical cross-sectional view of a clutch cover assembly according to a second embodiment of the present invention.
Figure 5:
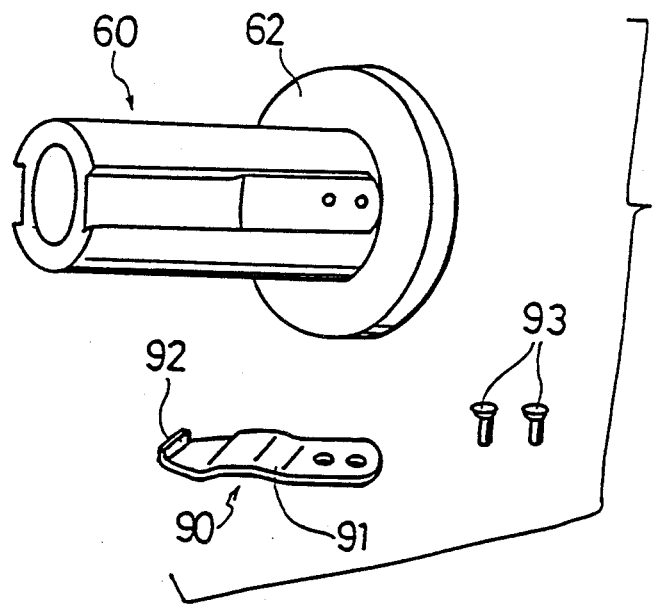
FIG. 5 is an exploded perspective view of a bearing hub and a locking member of the clutch cover assembly of FIG. 4.

2nd Embodiment:

FIGS. 4 and 5 illustrate a clutch cover assembly according to a second embodiment of the present invention. The clutch cover assembly of FIGS. 4 and 5 employs a different locking member from that of the first embodiment. The locking member of the second embodiment comprises two lock springs 90 mounted on the bearing hub 60 in diametrically opposite relation, i.e., 180° from each other about the hub 60. Each of the lock springs 90 has a central raised portion 91 displaced laterally, i.e., perpendicular to the longitudinal axis of the spring 90 and a hook portion 92 which is bent substantially perpendicularly from one end of the lock spring 90 in the same direction as that in which the raised portion 91 is displaced. The opposite end of the lock spring 90, remote from the hook portion 92, is fastened to the bearing hub 60 by two rivets 93. The hook portion 92 engages a groove defined in the inner periphery of the inner race 43.

Figure 6:
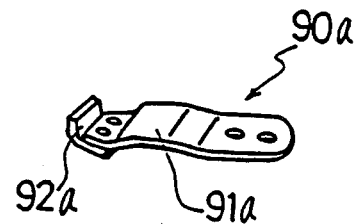
FIG. 6 is a perspective view of a modified locking member.

FIG. 6 shows a modification in which a lock spring 90a has a separate hook portion 92a fastened to a raised portion 91a.

During normal usage of the clutch cover assembly, the inner race 43 and the bearing hub 60 are held in locked engagement with each other by the lock springs 90. Therefore, the clutch can be disengaged by turning the release fork 80 clockwise (FIG. 4). The bearing hub 60 can be disengaged from the inner race 43 simply by manually depressing the raised portion 91 (or 91a) of each lock spring 90 (or 90a) radially inwardly to displace the hook portion 92 (or 92a) out of the groove in the inner race 43. With the bearing hub 60 thus disengaged from the inner race 43, the bearing hub 60 can be slid toward the transmission and removed from the bearing 40 After the bearing hub 60 has been detached, the transmission can easily be dismounted from the engine, and no wide space is required in the clutch cover assembly for such detachment of the transmission.

Figure 7:
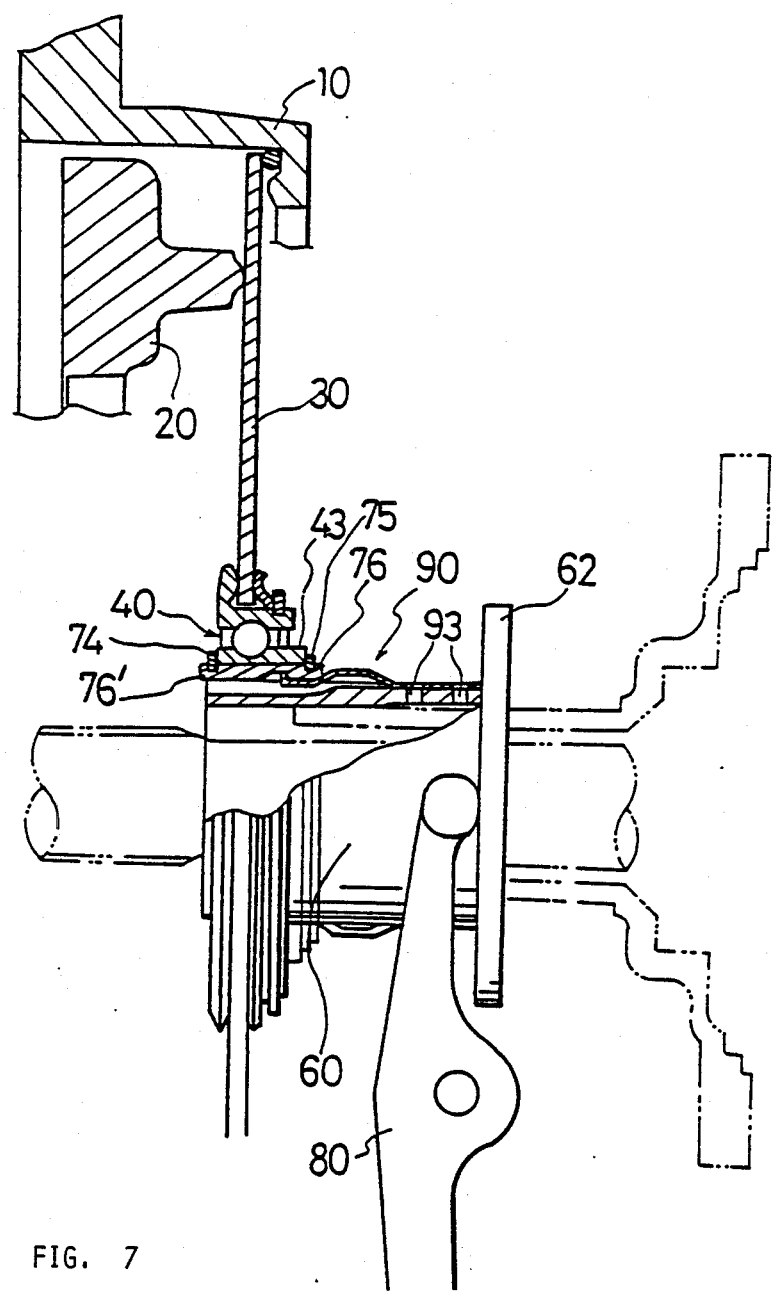
FIGS. 7 and 8 are fragmentary, vertical cross-sectional views of clutch cover assemblies according to modifications of the second embodiment.

FIG. 7 shows a modified clutch cover assembly which additionally employs a sleeve 76' disposed between the inner race 43 and the bearing hub 60 and secured to the inner race 43 by snap rings 74, 75, as with the modification of FIG. 3. The bearing 40 can thus be of a commercially available standard configuration.

Figure 8:
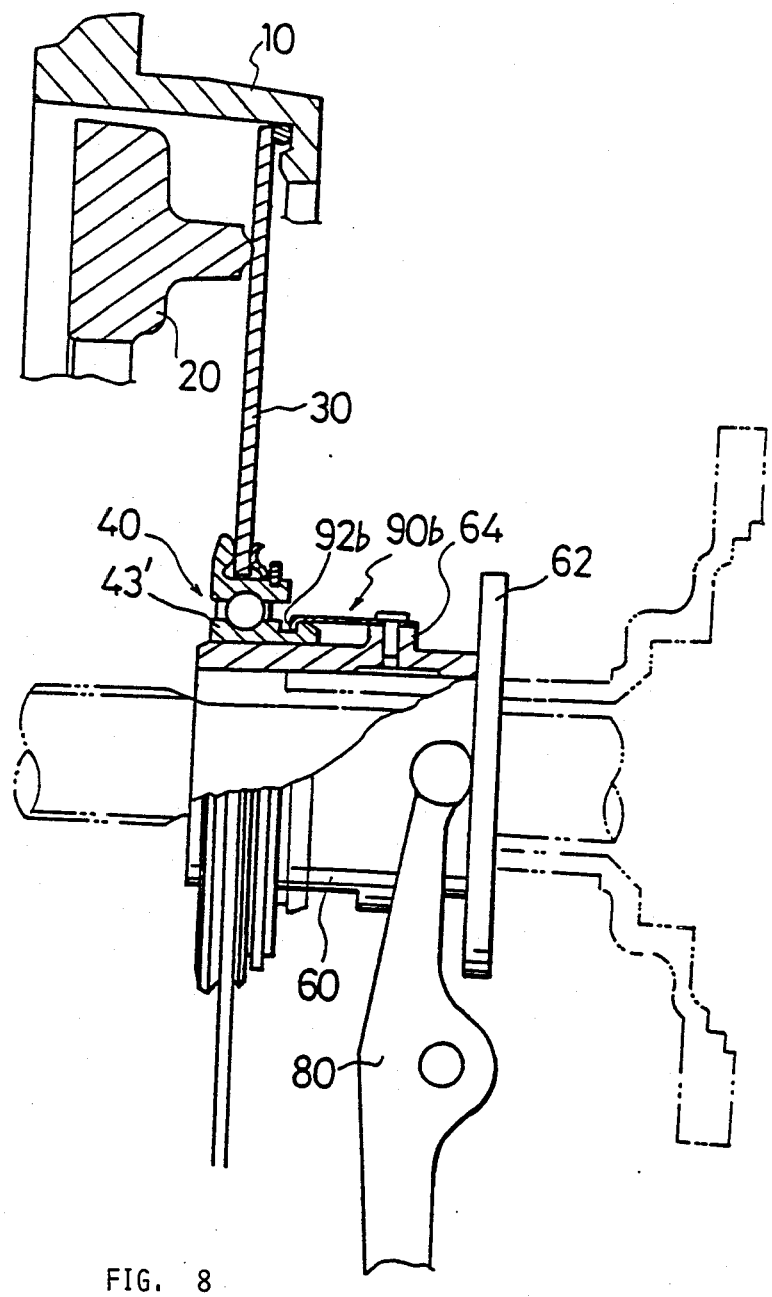

According to another modification shown in FIG. 8, a locking member comprises a lock spring 90b having on one end thereof a hook portion 92b engaging in a groove defined in the outer periphery of the inner race 43' of the bearing 40. The lock spring 90b is fastened to a raised portion 64 on the outer periphery of the bearing hub 60.

Figure 9:
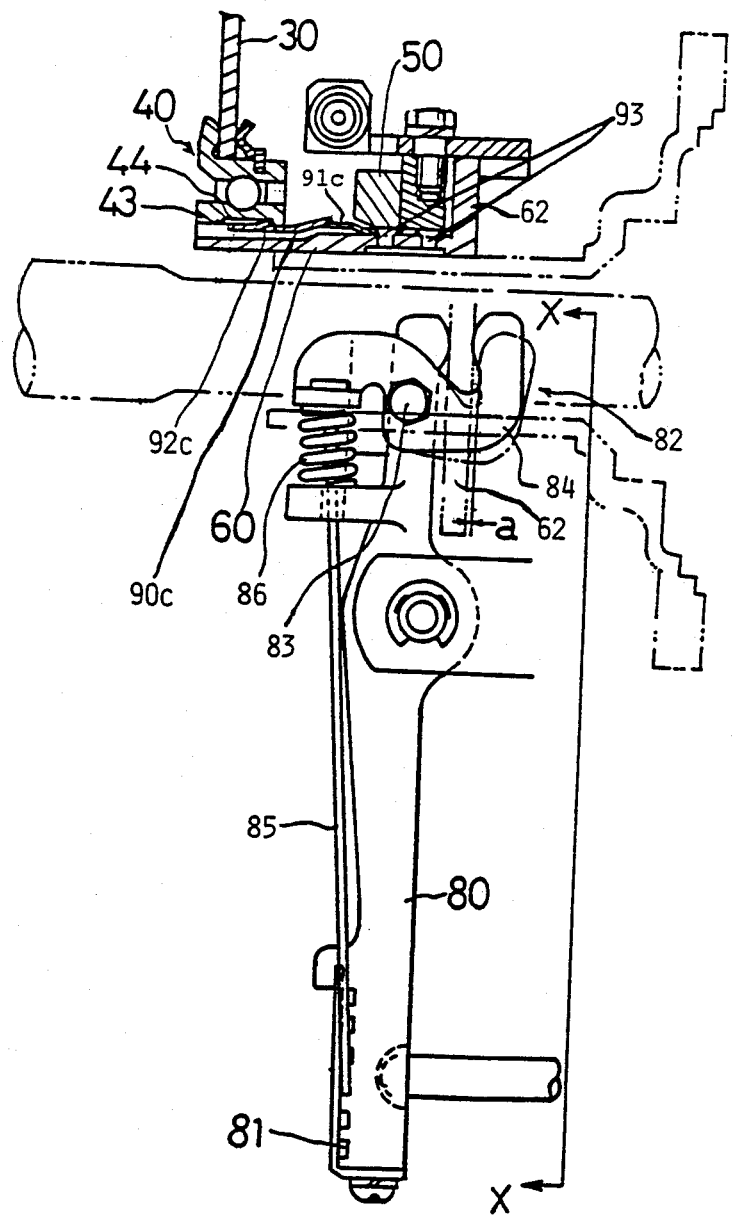
FIG. 9 is a fragmentary, vertical cross-sectional view of a clutch cover assembly according to a third embodiment of the present invention.

3rd Embodiment:

With reference to FIG. 9, a clutch cover assembly according to a third embodiment of the present invention includes a clutch cover (not shown), a pressure plate (not shown), a diaphragm spring 30, a bearing 40, a bearing hub 60, a locking member 90c, a release fork 80, and a ring member 50. The clutch cover, the pressure plate, the diaphragm spring 30, the bearing 40, the bearing hub 60, and the release fork 80 are substantially identical to those of FIG. 1 and will not be described in detail.

Figure 11:
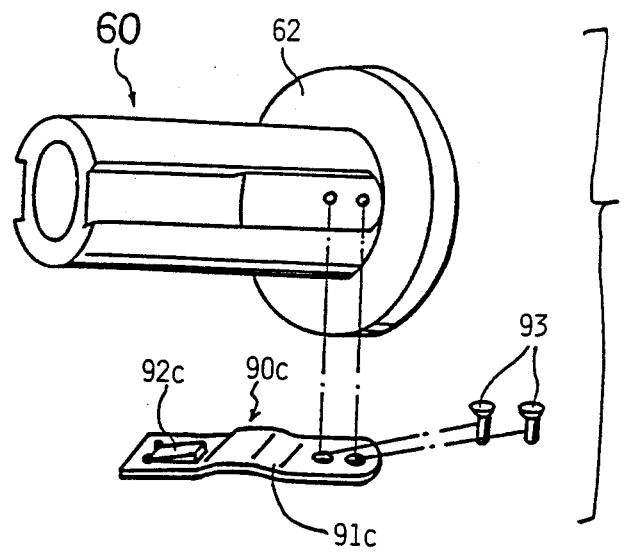
FIG. 11 is an exploded perspective view of a bearing hub and a locking member of the clutch cover assembly of FIG. 9.

The locking member 90c comprises two lock springs as shown in FIG. 11. A locking device 82 is mounted on the release fork 80.

The inner race 43 of the bearing 40 has grooves 44 in which the respective lock springs 90c engage. Each of the lock springs 90c has one end fastened to the outer periphery of the bearing hub 60 by two rivets 93 (FIG. 11). The lock spring 90c has a central raised portion 91c displaced laterally and a tooth 92c projecting, by lancing, from the opposite end in the same direction as that in which the raised portion 91c is laterally displaced. The tooth 92c engages in one of the grooves 44 of the inner race 43. Alternatively, the locking member may be the type of lock spring as shown in FIG. 5.

Figure 10:
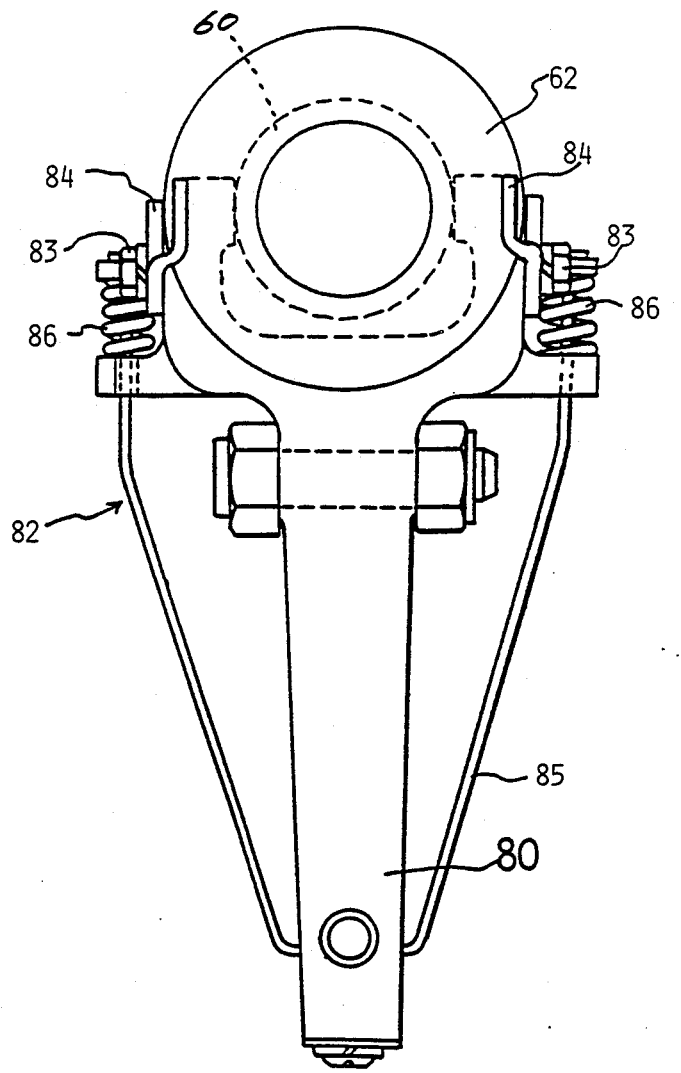
FIG. 10 is an elevational view of a release fork taken along line X—X of FIG. 9.

With reference to FIGS. 9 and 10, the locking device 82 includes two lock levers 84 pivotally mounted by respective bolts 83 on the two fork arms of the release fork 80, the lock levers 84 being angularly movable in planes parallel to the axis of the bearing hub 60. Each of the lock levers 84 is of a flat plate substantially in an S shape. The free end of each lock lever 84 is positioned on one side of the flange 62 closer to the transmission. The other ends of the lock levers 84 are interconnected by a substantially V-shaped wire 85 with its intermediate portion engaging in a selected one of spaced slots 81 defined in the lower end of the release lever 80.

With the wire 85 under tension the flange 62 is gripped between the free ends of the lock levers 84 and the free ends of the release fork 80. When the wire 85 is released of tension, the free ends of the lock levers 84 are displaced off the flange 62, leaving a gap a therebetween. The tire 85 is normally fixed to the release fork 80 by one of the slots 81 with springs 86 acting between the lock levers 84 and the release fork 80 for normally urging the lock levers 84 in a direction to disengage from the flange 62. A ring member 50 which is disposed around the bearing hub 60 is limited in movement by the raised portions 91c of the lock springs 90c and the flange 62.

The clutch is disengaged by turning the release fork 80 clockwise (FIG. 9). More specifically, as the bearing hub 60 is moved toward the transmission, the bearing 40 is also moved toward the transmission since the bearing 40 engages the bearing hub 60 through the lock springs 90c. The diaphragm spring 30 is also displaced to release the pressure plate, thus disconnecting the clutch. The clutch can be connected again by turning the release fork 80 counterclockwise, thus moving the bearing hub 60, the bearing 40, and the diaphragm spring 30 back toward the engine to press the pressure plate.

For detaching the transmission from the engine, the wire 85 is released from the release fork 80 to unlock the locking device 82, whereupon the lock levers 84 are disengaged from the flange 62 with the gap a left therebetween. Then, the upper free ends of the release fork 80 are axially moved leftward toward the engine to axially displace the ring member 50 toward the engine by the distance equal to the gap a. The ring member 50 pushes the raised portions 91c of the lock springs 90c radially inwardly until the teeth 92c of the lock springs 90c are displaced radially inwardly out of the grooves 44 of the inner race 43, whereupon the bearing 40 and the bearing hub 60 are disengaged from each other. Thereafter, the upper free ends of the release fork 80 are moved rightward away from the engine to pull the bearing hub 60 from the bearing 40. The transmission can now be disassembled from the engine. At this time, the input shaft of the transmission only needs to be slid up to the end face of the bearing 40 which faces the transmission. Therefore, no large space is required in the clutch cover assembly for removal of the transmission.

Figure 12:
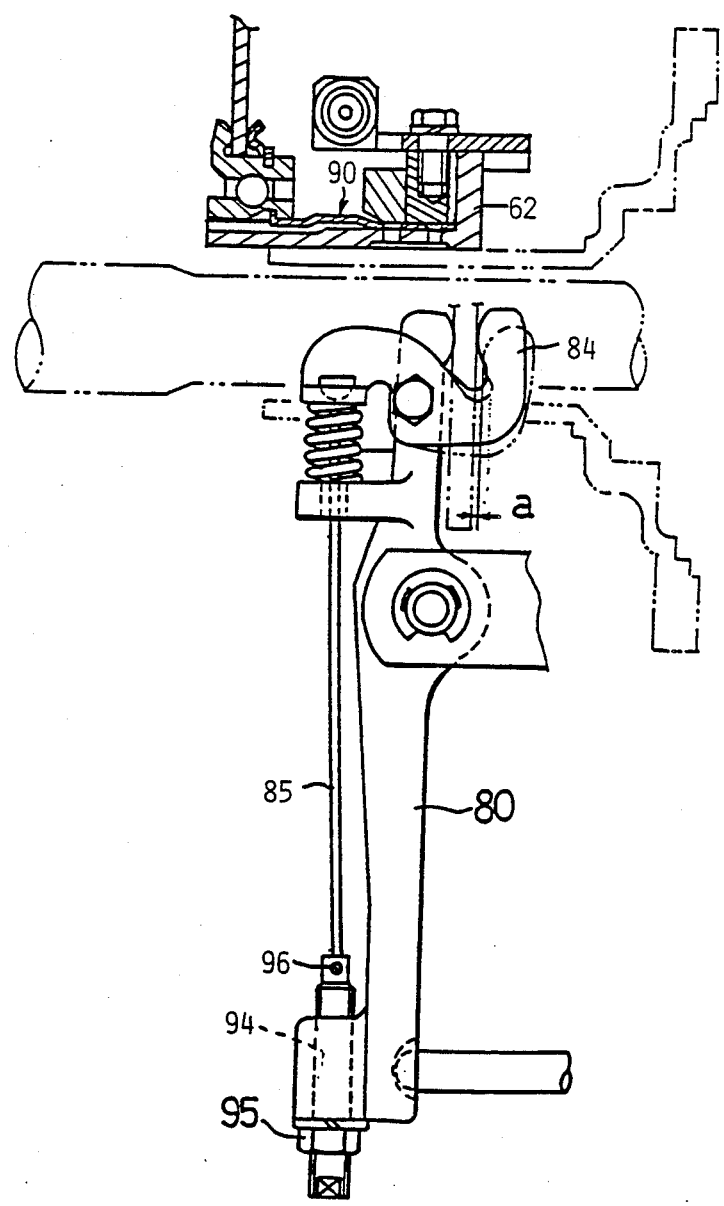
FIG. 12 is a fragmentary, vertical cross-sectional view of a clutch cover assembly according to a modification of the third embodiment.
Figure 13:
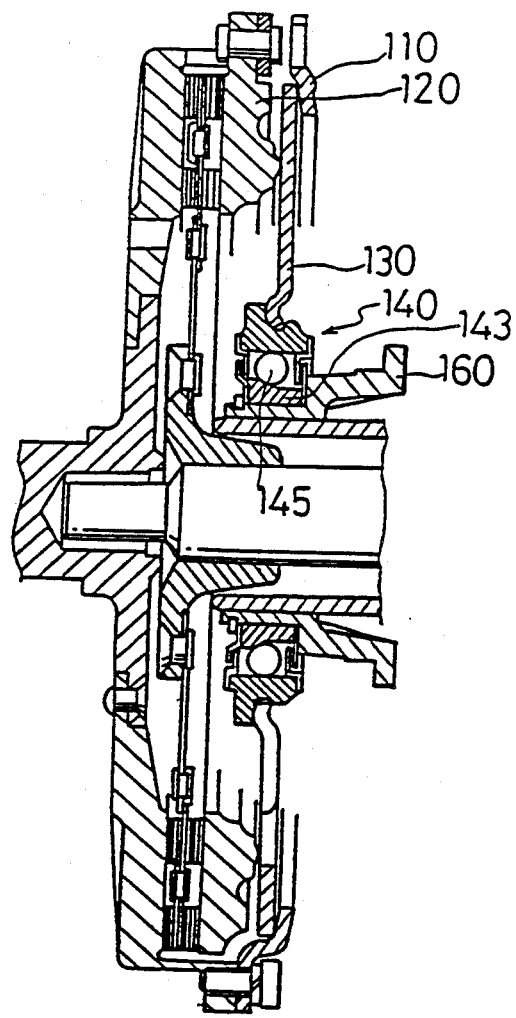
FIG. 13 is a vertical cross-sectional view of a conventional clutch cover assembly of the prior art.

FIG. 12 shows a modified attachment of the locking device 84. The release fork 80 has an internally threaded hole 94 defined in the lower end thereof, and a bolt 95 is threaded in the hole 94. The bolt 95 has a hole 96 defined in an end thereof, and the intermediate portion of the wire 85 is inserted through the hole 96 of the bolt 95. The clutch cover assembly shown in FIG. 12 employs the locking member 90 shown in FIGS. 4 and 5.

The flange 62 is gripped by the release fork 80 and the lock levers 84 by tightening the bolt 95, an released from engagement with the lock levers 84 by loosening the bolt 95.

Although certain preferred embodiments have been shown and described, the invention which is intended to be protected is not to be construed as limited to particular embodiments disclosed. It is to be understood that many changes and modifications may be made therein without departing from the scope of the appended claims.

What is claimed is:

1. A clutch cover and clutch release bearing assembly comprising:

a clutch cover adapted to be coupled to a flywheel of an engine;

a pressure plate disposed inwardly of said clutch cover;

a diaphragm spring having an outer edge engaged by said clutch cover for resiliently pressing said pressure plate;

a bearing fixed to an inner edge of said diaphragm spring and having rotatable elements, an inner race supporting said rotatable elements and having a groove defined in an inner periphery thereof;

a bearing hub axially movable disposed in said bearing for being axially movably disposed on an input shaft of a transmission;

locking means positioned between said inner race and said bearing hub for selectively limiting movement of said bearing hub with respect to said bearing and being disengageable from said bearing to allow said bearing hub to disengage from said bearing, said locking means including at least one lock spring for selectively locking said bearing hub against movement relative to said bearing in a direction away from said engine, said at least one lock spring having one end fixed to said bearing hub and an opposite end normally engaged with said groove of said inner race and said bearing hub being axially movable away from the engine when the opposite end of the lock spring is displaced out of said groove; and a release fork engageable with said bearing hub for axially moving said bearing hub and said bearing away from the engine to release said diaphragm spring from pressing engagement with said pressure plate.

2. The clutch cover assembly according to claim 1, wherein said lock spring has a central raised portion, said opposite end thereof having a hook portion integral with said central raised portion and normally engaging in said groove, said hook portion being displaceable out of said groove by pushing said central raised portion toward said bearing hub.

3. The clutch cover assembly according to claim 1, wherein said lock spring has a central raised portion, opposite end thereof having a separate hook portion fastened to said central raised portion and normally engaging said groove, said hook portion being displaceable out of said groove by pushing said central raised portion toward said bearing hub.

4. A clutch cover and clutch release bearing assembly comprising:

a clutch cover adapted to be coupled to a flywheel of an engine;

a pressure plate disposed inwardly of said clutch cover;

a diaphragm spring having an outer edge engaged by said clutch cover for resiliently pressing said pressing plate;

a bearing fixed to an inner edge of said diaphragm spring and having rotatable elements and an inner race supporting said rotating elements;

a bearing hub axially movably disposed in said bearing for being axially movably disposed on an input shaft of a transmission;

locking means positioned between said inner race and said bearing hub for selectively limiting movement of said bearing hub with respect to said bearing and being disengageable from said bearing to allow said bearing hub to disengage from said bearing, said locking means including at least one lock spring for selectively locking said bearing hub against movement relative to said bearing in a direction away from said engine;

a sleeve fixedly disposed inside said inner race, said sleeve having a groove defined in an inner periphery thereof and said at least one lock spring having one end fixed to said bearing hub and an opposite end normally engaging said groove of said sleeve, said bearing hub being axially moveable away from the engine when said opposite end of the lock spring is displaced out of said groove; and a release fork engageable with said bearing hub for axially moving said bearing hub and said bearing away from the engine to release said diaphragm spring from pressing engagement with said pressure plate.

5. The clutch cover assembly according to claim 4, wherein said lock spring has a central raised portion, said opposite end thereof having a hook portion integral with said central raised portion and normally engaging said groove, said hook portion being displaceable out of said groove by pushing said central raised portion toward said bearing hub.

6. The clutch cover assembly according to claim 4, wherein said lock spring has a central raised portion, said opposite end thereof having a separate hook portion fastened to said central raised portion and normally engaging said groove, said hook portion being displaceable out of said groove by pushing said central raised portion toward said bearing hub.

* * * * *